United States Patent
Yueh

[15] 3,647,482
[45] Mar. 7, 1972

[54] REDUCTION AND MODIFICATION OF THE UNPLEASANT AFTERTASTE OF SACCHARIN

[72] Inventor: Mao Hsun Yueh, Minneapolis, Minn.
[73] Assignee: General Mills, Inc.
[22] Filed: Mar. 4, 1970
[21] Appl. No.: 16,602

Related U.S. Application Data

[63] Continuation-in-part of Ser. No. 539,669, Apr. 4, 1966, abandoned.
[52] U.S. Cl. ............................................99/141 A, 99/140
[51] Int. Cl. ..............................................A23l 1/26
[58] Field of Search ....................99/141 A, 140 N; 195/28 N
[56] References Cited

UNITED STATES PATENTS 2,803,551 8/1957 Helgren .................................99/141
3,326,697 6/1967 Shimazono et al.......................99/140
3,510,311 5/1970 Swaine et al...............................99/78

OTHER PUBLICATIONS

Merck and Company, Mertaste for the Food Industry, Merch and Company, Rahway, New Jersey Primary Examiner—Raymond N. Jones
Assistant Examiner—Roger B. Andewelt
Attorney—Anthony A. Juettner, Gene O. Enockson and Norman P. Friederichs

[57] ABSTRACT

The unpleasant aftertaste of saccharin-containing compositions is reduced by incorporating with the saccharin a flavor modifier selected from the group consisting of ribonucleosides, ribonucleotides and their deoxy analogs. The saccharin and flavor modifier mixture is heat-treated such as by boiling the mixture in water.

4 Claims, No Drawings

REDUCTION AND MODIFICATION OF THE UNPLEASANT AFTERTASTE OF SACCHARIN

This is a Continuation-In-Part of application, Ser. No. 539,669, filed Apr. 4, 1966 and now abandoned.

The present invention relates to a method of reducing and/or eliminating the unpleasant aftertaste of artificial sweeteners either by themselves or in food products and also relates to the resultant products.

Many attempts are being made to reduce the percentage of carbohydrates in food products by substituting artificial sweeteners such as saccharins, cyclamates and the like. These materials are effective in providing a suitable degree of sweetness in a variety of products but are subject to the disadvantage that in general they have undesirable aftertastes which are objectionable to a large percentage of the consumers. As a result, these artificial sweeteners have not been used to the extent that they might be used in the event that they did not have the aftertaste disadvantage.

It has now been discovered that it is possible to reduce or eliminate this undesirable aftertaste of artificial sweeteners by adding to the artificial sweetener or food product containing such an artificial sweetener any of a variety of compounds which for the present purposes function as flavor modifiers. These flavor modifiers are in the general category of ribonucleotides, ribonucleosides and their deoxy analogs. A number of the ribonucleotides are recognized as flavor potentiators. In this respect, they are used not for their inherent flavor themselves but as a means for intensifying or enhancing the flavor of a substrate into which they are put. In the present invention, these compounds function as flavor modifiers rather than as enhancers or potentiators.

It is therefore an object of the present invention to provide a process for reducing or eliminating the undesirable aftertaste of artificial sweeteners by the inclusion of a member of a class of flavor modifiers in such products. It is another object of the present invention to provide novel products in which the undesirable aftertaste of artificial sweeteners has been thus reduced or eliminated. The artificial sweeteners to which the present invention is applicable comprise synthetic artificial sweeteners known as saccharins, typically, calcium saccharin or sodium saccharin.

The flavor modifiers contemplated by the present invention are all included within the class of ribonucleosides, ribonucleotides and their deoxy analogs. The ribonucleotides and their deoxy analogs would include the free acid form of the phosphate moiety or, as is frequently done in the case of the flavor enhancers, in the form of the sodium or other salts of the phosphate moiety. The base moiety of the nucleotides and the nucleosides is preferably the purine base although pyrimidine bases may also be used. In addition, it is also possible to employ the deoxy form of the ribonucleosides and nucleotides such as the 2'- or 3'-deoxynucleosides and deoxynucleotides. Typical flavor modifiers which may be used in the present invention include 5'-inosinic acid and 5'-guanylic acid, 5'-cytidylic acid and 5'-uridylic acid as well as the alkali metal salts of the same. Similarly, the ribonucleosides, adenosine, guanosine, inosine, thymidine and cytidine may be used. Suitable deoxy compounds include 2'-deoxyadenosine, 2'-deoxycytidine, 3'-deoxyadenosine, etc., as well as the deoxy forms of the ribo-nucleotides, such as deoxyguanylic acid, deoxyadenylic acid, deoxyinosinic acid, etc.

In use it is necessary to include one or more of the above flavor modifiers either in the artificial sweetening composition or in the food product sweetened therewith. The amount of the flavor modifier employed can be varied considerably. Even minute quantities have some effect upon reducing the bitter aftertaste of artificial sweeteners but in general it is preferable to employ a quantity of at least 0.001 percent based on the weight of the food or beverage product. The quantity can be increased up to a level of about 0.1 percent and even higher. However, commercial considerations usually would dictate that the flavor modifier not be used in a concentration in excess of 0.1 percent based on the weight of the ultimate food or beverage. Where the product is the artificial sweetener per se, as for example a dry solid saccharin, the amount of modifier is generally in the range of 0.02 part to 1 part per part of the saccharin solids. The preferred range is 0.1–0.5 part.

It has been surprisingly discovered that substantially improved results can be obtained if the saccharin and flavor modifier are heat-treated. In the preferred method of heat treatment the saccharin and flavor modifier are added to an open vessel of water and the water is boiled for at least about 10 minutes, preferably about 30 to 60 minutes. A longer period of boiling, however, is not believed to be detrimental so long as sufficient water remains to prevent burning of the saccharin and flavor modifier. For example, satisfactory results have been obtained by boiling for 3 hours. It should be recognized that boiling, as used herein, means open boiling and not refluxing. The boiled mixture of saccharin, nucleotide and water may be used as a sweetening composition. If desired, the water may be removed such as by vacuum evaporation or spray drying. The dried sweetener then may be ground if desired. The dried sweetener may be dissolved in a suitable solvent such as water and can be used as a liquid sweetener.

The following examples will serve to illustrate the invention but are not to be considered as limiting thereof.

EXAMPLE I

A series of three beverage Samples I–A through I–C were prepared using orange flavored Kool Aid as the beverage base. Sample I–A is a preferred embodiment of the present invention and included 0.940 gram of saccharin, 0.188 gram of a nucleotide composition, 4.3 grams of orange flavored Kool Aid and 7/8 gallon of water. The saccharin and nucleotide composition had been previously heat-treated according to the present invention. The heat modified saccharin and nucleotide composition was prepared by dry blending, by weight, 5 parts of saccharin and 1 part of nucleotide. The nucleotide was a 1 to 1 mixture of disodium guanylate and disodium inosinate. The dry blend was dissolved in 50 parts of water. The solution was boiled for 30 minutes and then vacuum dried. The dry material was finely ground. Sample I–B was prepared identically to sample I–A except the saccharin and nucleotides were not heat-treated. Sample I–C was a control and included the type of sweetener presently used in diet beverages such as artificially sweetened cola beverages. This sweetener comprises a mixture of sugar and saccharin. Sample I–C was prepared by mixing 4.3 grams of orange flavored Kool Aid, 7/8 gallon of water, 19.5 grams of sucrose, 19.5 grams dextrose and 0.740 gram saccharin. The samples I–A through I–C were taste tested by a panel of five persons. All five persons found that Sample I–C was less bitter than Sample I–B. One person found that sample I–A was less bitter than sample I–C, three persons found no difference in bitterness between samples I–A and I–C and one person found that sample I–C was less bitter than sample I–A. The panel results thus show a substantial improvement in the present invention when the saccharin and nucleotide are heat-treated as compared to the saccharin and nucleotide absent heat-treatment. The panel results also indicate that the heat-treated saccharin and nucleotide sweetener is equal to the sugar and saccharin mixture as regards level of bitterness. Moreover, the beverage prepared using the heat-treated saccharin and nucleotide mixture has substantially less carbohydrate content than the beverage prepared using sugar-saccharin mixture.

EXAMPLE II

A carbonated cola drink was prepared according to the present invention by mixing 4 milliliters of a cola flavoring*, 1.2 milliliters of an 85 percent aqueous solution of $H_3PO_4$, 2.28 grams of the ground heat-modified saccharin and nucleotide composition of Example I, 0.79 gram of caramel color and 1 gallon of water. The resulting solution was carbonated by passing carbon dioxide gas therethrough. The drink may be carbonated using conventional carbonation techniques. The carbonated cola may then be bottled.

EXAMPLE III

A liquid form of artificial sweetening agent was prepared by dissolving 10 grams of saccharin and 2 grams of a nucleotide mixture in 100 milliliters of water. The nucleotide mixture included 1 gram of disodium guanylate and 1 gram of disodium inosinate. The solution was boiled for 30 minutes. The boiled solution, which had a volume of about 50 milliliters, was diluted with water to a concentration of about 2 percent saccharin and

* The cola flavoring included 1 milliliter of a flavoring produced by International Flavor & Fragrances, Inc. under the designation V-14681 and 3 milliliters of a flavoring produced under the designation V-12407.

about 0.4 percent nucleotides. The final solution contained about 0.1 percent benzoic acid and 0.05 percent propylparaben as preservatives.

The embodiments of the invention in which an exclusive property or privilege is claimed are defined as follows:

1. A method for reducing the unpleasant aftertaste of a saccharin containing composition which comprises dissolving in water saccharin and a flavor modifier selected from the group consisting of ribonucleosides, ribonucleotides and their deoxyanalogs and boiling the resulting solution for at least about 10 minutes, said flavor modifier being present in an amount sufficient to reduce the aftertaste of the saccharin.

2. The method of claim 1 wherein the saccharin is calcium saccharin or sodium saccharin and the ribonucleotide is used in the form of an alkali salt thereof.

3. The method of claim 1 including the further step of removing the water of said solution thereby providing a dry, powdered sweetener.

4. The method of claim 3 wherein the flavor modifier is used in an amount in the range of 0.02 to 1 part of flavor modifier per part of saccharin by weight based on the weight of the saccharin.

* * * * *